United States Patent [19]

Lowther

[11] Patent Number: 5,259,973
[45] Date of Patent: Nov. 9, 1993

[54] TREATMENT OF SPILLS WITH GELATIN

[75] Inventor: Frank E. Lowther, Plano, Tex.

[73] Assignee: Atlantic Richfield Company, Los Angeles, Calif.

[21] Appl. No.: 966,493

[22] Filed: Oct. 26, 1992

[51] Int. Cl.$^5$ ................................................ C02F 1/40
[52] U.S. Cl. ..................... 210/671; 210/691; 210/711; 210/924; 210/925
[58] Field of Search ............... 134/6; 210/671, 680, 210/691, 924, 925, 711

[56] References Cited

U.S. PATENT DOCUMENTS 5,039,414  8/1991  Mueller et al. ................... 210/924

OTHER PUBLICATIONS

Encyclopedia of Chemical Technology, Kirk-Othmer Third Edition, vol. 11, J. Wiley & Sons, N.Y. pp. 711-715 and 911-920.

Encyclopedia of Polymer Science and Engineering, vol. 7, J. Wiley & Sons, N.Y. pp. 488-513.

*Primary Examiner*—Ivars Cintins
*Attorney, Agent, or Firm*—Drude Faulconer

[57] ABSTRACT

A method is provided for treating "spills" of materials, e.g. an offshore oil spill, wherein an ungelled mixture of gelatin is deposited onto the material and then allowed to gel. As the gelatin gels, it "traps" or entrains the material into the gelled mass of gelatin whereby the material can readily be retrieved by merely retrieving the gelled gelatin. The gelling of gelatin is fully reversible in that gelatin will return to its liquid state merely upon reheating, thereby allowing the spilled material to be separated from the gelatin so that the material can be recovered and the gelatin to be reused.

7 Claims, 1 Drawing Sheet

COLD GELATIN

HOT GELATIN

HOT MIXTURE

COLD MIXTURE

TREATMENT OF SPILLS WITH GELATIN

DESCRIPTION

1. Technical Field

The present invention relates to the treatment of spills, e.g. liquid and/or particulate spills, with gelatin and in one of its aspects relates to a method for treating of spilled material by spreading a mixture of ungelled gelatin over the material and then allowing the mixture to gel to entrap the spill material whereby the material is readily recovered by retrieving the gelled gelatin.

2. Background Art

It is not uncommon for spills to occur when storing and/or transporting large volumes of liquid or particulate materials. Such spills can occur both on land (e.g. from storage tanks, pipelines, tank trucks, etc.) and offshore (e.g. submerged pipelines, tanker ships, etc.). Some of these spills are not only costly in terms of lost product but, more importantly in some instances, also in terms of the potential damage that may be done to the environment.

Probably the best publicized of these types of spills involve hydrocarbons (e.g. oil) and/or other chemicals which leak from marine pipelines or damaged tanker ships. The spilled oil floats on the surface or the water and, if not immediately controlled, becomes dispersed by surface forces, aided by wind and wave action, over large areas before it is ultimately washed ashore.

There have been many techniques proposed for controlling and treating such spills. For example, booms or other floating barriers have been deployed around the spill to contain the spilled oil within the barrier until the oil can be suctioned or otherwised recovered, e.g. through the use of specially-built, "skimmer ships". While such booms have been used successfully in some instances, they are often difficult to deploy and do not operate well in rough seas.

In other instances, an absorbent material (e.g. straw, wood chips, etc.) or special chemicals have been spread onto the spill to physically or chemically react with the oil to facilitate its recovery. These techniques have operated well in some environments but may present substantial disposal problems once they have been retrieved from the water. That is, it is often extremely difficult, if possible at all, to separate the oil from the absorbent material or chemicals upon recovery from the water thereby requiring disposal of the oil along with the absorbent material and/or chemicals.

SUMMARY OF THE INVENTION

In accordance with the present invention, a method is provided for treating "spills" of materials, e.g. an offshore oil spill, wherein an ungelled mixture of common or technical gelatin is spread or otherwise deposited onto the material and then allowed to gel. As the gelatin gels, it "traps" or entrains the material into the gelled mass of gelatin whereby the material can readily be retrieved by merely retrieving the gelled gelatin.

The ungelled gelatin mixture used in the present invention is first prepared by blending common or technical gelatin (e.g. from about 15% to about 85% by weight) with a heated liquid, e.g. hot water at about 180° F. The heated gelatin mixture is maintained at a temperature (e.g. about 170° F.) above its gelling temperature (e.g. around 100° F.) until it is deposited onto the spilled material. As the hot gelatin mixture contacts the spilled material, it begins to cool. When the gelatin mixture reaches its gelling temperature

BEST KNOWN MODE FOR CARRYING OUT INVENTION

In accordance with the present invention, a method is provided for treating "spills" of materials wherein an ungelled mixture of common or technical gelatin is spread or otherwise deposited onto the material and then allowed to gel. As the gelatin gels, it "traps" or entrains the material into the gelled mass of gelatin whereby the material can readily be retrieved by merely retrieving the gelled gelatin. While the present invention will be described below primarily in relation to an offshore, oil spill, it should be recognized that the present method can also be used to treat spills of other materials, i.e. liquids (e.g. chemicals) or even particulate material (e.g. sand, grandulated chemicals, etc.) since gelatin will intertwine and entrap almost any substance except raw pineapple juice. Further, the method can also be used to treat certain land-based spills, e.g. spills on paved surfaces, viaducts, bar ditches, etc.

As is well known and as used herein, "gelatins" specifically refer to high molecular weight polypeptides derived from collagen which, in turn, is the primary protein component of animal connective tissue (e.g. bones, skin, hides, tendons, etc.). Gelatin, which is commonly used in foods, glues, photographic and other products, does not exist in nature and is a hydrolysis product obtained by hot water extraction from the collageous raw material after it has been processed with acid, alkaline, or lime. The viscosity of aqueous gelatin solutions increases with increasing concentrations and decreasing temperatures. For a more complete description and discussion of gelatin, its compositions and properties, see ENCYCLOPEDIA OF CHEMICAL TECHNOLOGY, Kirk-Othmer, 3rd Edition, Vol. 11, J. Wiley & Sons, N.Y., pps. 711 et sec. (e.g. less than 100° F.), it gels thereby entrapping the spilled material with which it is in contact.

As the gelatin mixture cools, it may form a continuous "blanket" of gelled gelatin and oil or, in some cases, it may form "chunks" of gelled gelatin with the spilled material trapped therein. In either event, the gelled gelatin and entrapped oil can readily be retrieved in this solid or semi-solid form. One very important advantage of using gelatin to treat the spill is that the gelling of gelatin is fully reversible. That is, gelatin will return to its liquid state merely upon reheating.

Accordingly, once the gelatin and entrapped spilled material have been retrieved, the gelatin mass can be heated to a temperature (e.g. 180° F.) above its gelling temperature to reform the aqueous mixture of gelatin. The spilled material can then easily be separated from this ungelled mixture by any well known means. This readily permits the reclamation of the spilled material and allows the gelatin to be reused, either in the same or future spill treatment of "clean-up" operations.

BRIEF DESCRIPTION OF THE DRAWINGS

The actual construction, operation, and apparent advantages of the present invention will be better understood by referring to the drawings in which like numerals refer to like parts and in which.

More specifically, the present invention provides a method for treating a spill of material, e.g. an oil spill at an offshore location. A mixture of ungelled gelatin is first prepared by blending common or technical gelatin (e.g. commercial grade A or B) with a heated liquid, e.g. hot water at about 180° F. In formulating this gelatin mixture, it has been found that the hardness or firmness of the gelatin, once gelled, is primarily dependent on the amount of gelatin in the mixture and is relatively independent on the actual liquid (e.g. water) used to form the gelatin mixture. While the exact formulation of a particular gelatin mixture will likely vary depending on the actual conditions under which it is to be used, a typical gelatin mixture in accordance with the present invention will be comprised of from about 15% to about 85% by weight of gelatin mixed with from about 85% to about 15% by weight of hot water.

The heated gelatin mixture is maintained at a temperature (e.g. about 170° F.) above its gelling temperature (e.g. around 100° F.) until it is deposited onto the spilled material. Where the spill is an offshore oil spill, the gelatin mixture can be sprayed or otherwise deposited onto the spill from a vessel as it moves through and/or around the spill. As the hot gelatin mixture contacts the oil on the surface of the water, it immediately begins to cool. When the gelatin mixture reaches its gelling temperature (e.g. 100° F.), it gels thereby entrapping those oil molecules with which it is in contact.

Figure 1:
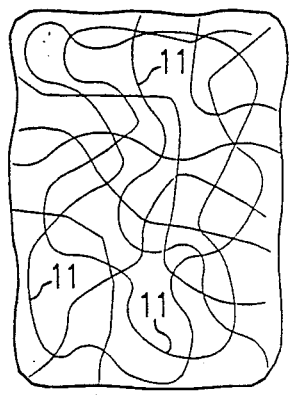
FIG. 1 is an idealized representation of gelatin molecules in a cooled aqueous solution.
Figure 2:
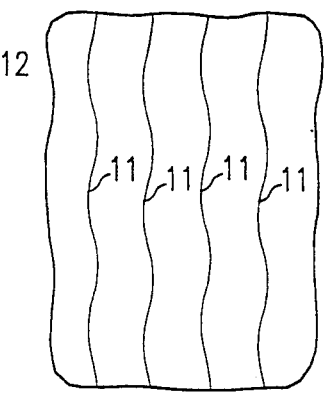
FIG. 2 is an idealized representation of the gelatin molecules of FIG. 1 in a heated state.
Figure 3:
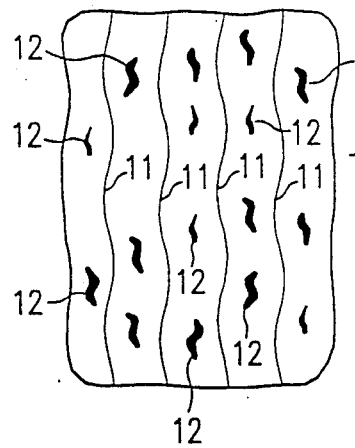
FIG. 3 is an idealized representation of the heated gelatin molecules of FIG. 2 with molecules of a treated solution blended therein.
Figure 4:
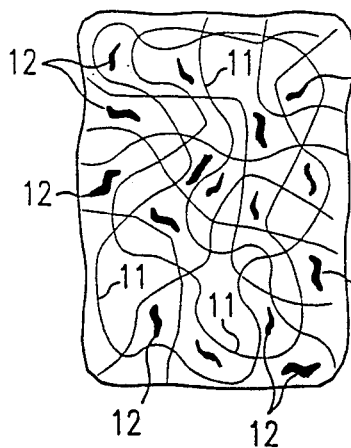
FIG. 4 is an idealized representation of the gelatin and treating solution molecules of FIG. 3 after cooling.

Just how the oil molecules are entrapped within the gelled gelatin mass can be better understood by referring to the drawings. FIG. 1 is a highly idealized representation of gelatin molecules 11 as they normally appear in a normal or cooled state. FIG. 2 represents the molecules as they appear when heated (e.g. above 180° F.) in an aqueous solution. Molecules of the spilled material (e.g. oil molecules 12) intertwine with the hot gelatin solution (FIG. 3) and are trapped therein by the gelatin molecules 11 as the gelatin-treating solution is cooled back to ambient temperature (FIG. 4).

As the gelatin mixture cools, it may form a continuous "blanket" of gelled gelatin and oil or, in some cases such as in rough seas, it may form "chunks" of gelled gelatin with the oil trapped therein. In either event, the gelled gelatin and entrapped oil can readily be retrieved by a vessel equipped for this purpose.

One very important advantage of gelatin, as used in the present invention, is that the gelling of gelatin is fully reversible, in that gelatin will return to its liquid state upon reheating. Accordingly, once the gelatin and entrapped oil (or other spilled material) has been retrieved, it can be heated to a "melting" temperature (e.g. 180° F.) above its gelling temperature to reform the aqueous mixture of gelatin. The oil or other material can then easily be separated from this ungelled mixture by any well known means, e.g. gravity separation, centrifuge or cyclone separation, etc. This readily permits the reclamation of the spilled material which can be beneficial from an economic standpoint and also allows the gelatin to be reused, either in the same or future spill "clean-up" operations.

What is claimed is:

1. A method of treating a material spill, said method comprising:

spreading a mixture of ungelled, gelatin over at least a portion of said spill;

allowing the gelatin to gel thereby entrapping said spilled material therein;

retrieving said gelled gelatin and said material entrapped therein;

heating said retrieved gelled gelatin and material to a temperature above the gelling temperature of said gelatin to thereby reform said ungelled gelatin mixture; and separating said material from said ungelled gelatin mixture.

2. The method of claim 1 wherein said mixture of ungelled gelatin comprises gelatin and a heated liquid.

3. The method of claim 2 wherein said heated liquid is water at a temperature of about 170° F.

4. The method of claim 3 wherein said mixture is allowed to gel by cooling to an ambient temperature of less than about 100° F.

5. The method of claim 2 wherein said gelatin mixture comprises:

from about 15% to about 85% by weight of gelatin.

6. The method of claim 1 wherein said material spill comprises an oil spill at an offshore location.

7. A method of treating an offshore oil spill, said method comprising:

depositing a heated mixture of ungelled, gelatin over at least a portion of said spill;

allowing the gelatin to cool to gel and thereby entrap said oil therein;

retrieving said gelled gelatin and said entrapped oil;

heating said retrieved gelled gelatin and oil to a temperature above the gelling temperature of said gelatin to thereby reform said ungelled gelatin mixture; and separating said oil from said ungelled gelatin mixture.

* * * * *